Aug. 20, 1940.    R. P. KROON    2,212,346
SUPPORTING CONSTRUCTION
Filed Jan. 19, 1939    2 Sheets-Sheet 1
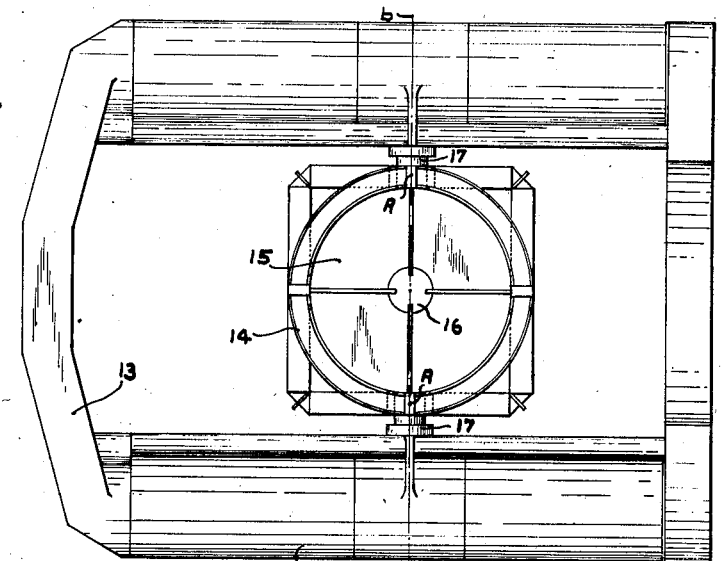
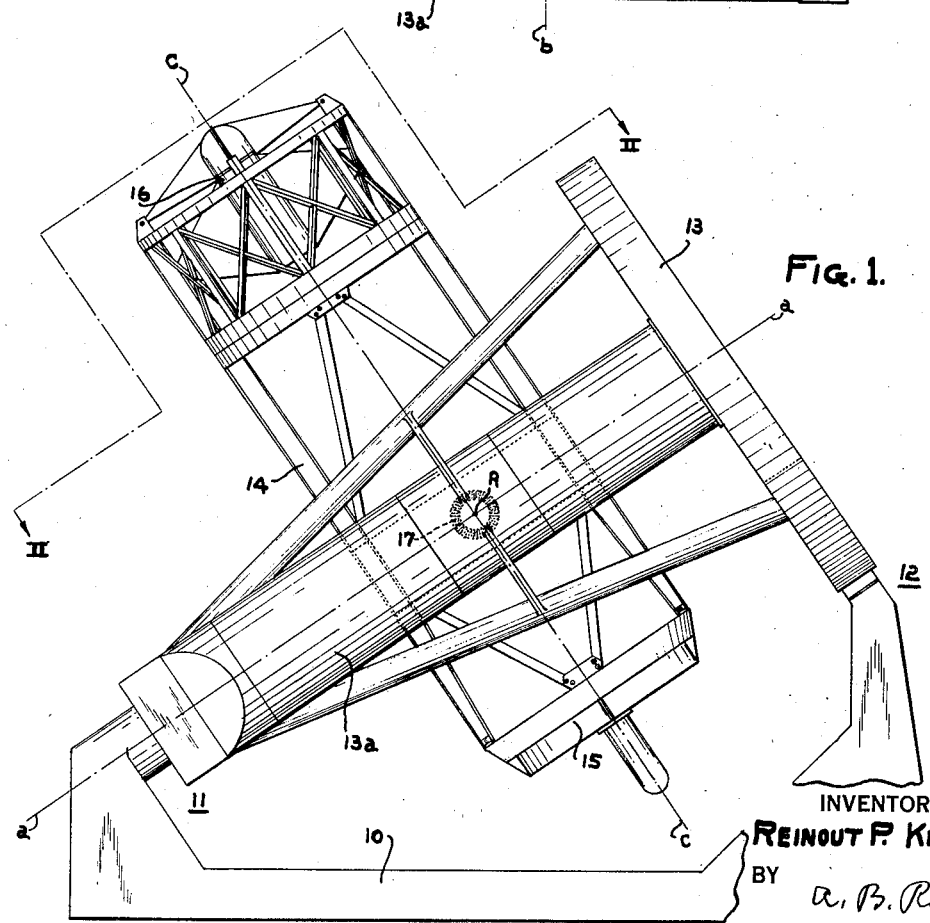
INVENTOR
REINOUT P. KROON.
BY
ATTORNEY Aug. 20, 1940.    R. P. KROON    2,212,346
SUPPORTING CONSTRUCTION
Filed Jan. 19, 1939    2 Sheets-Sheet 2

WITNESSES:
James X. Mosser
Andrew J. Cook

INVENTOR
REINOUT P. KROON.
BY
ATTORNEY

Patented Aug. 20, 1940

2,212,346

UNITED STATES PATENT OFFICE 2,212,346

SUPPORTING CONSTRUCTION

Reinout P. Kroon, Swarthmore, Pa., assignor to Westinghouse Electric & Manufacturing Company, East Pittsburgh, Pa., a corporation of Pennsylvania Application January 19, 1939, Serial No. 251,758

5 Claims. (Cl. 88—32)

My invention relates to a trunnion arrangement for supporting one structure from another and it has for an object to provide apparatus of this character constructed and arranged to minimize the transmission of distortions of the last-named structure to the first structure.

The invention is useful, for example, in connecting the tube structure of a telescope to its carrying or yoke structure, it being remembered that the yoke structure is mounted for angular movement about the polar axis and that the tube structure is mounted for movement with respect to the yoke structure about an axis normal to the polar axis, capacity for movement of the tube structure about these mutually perpendicular axes providing for direction thereof toward a desired star and the yoke structure providing for guidance of the tube structure firmly in its path following a star from east to west. As distortion of the yoke, due to its weight as well as to that of the tube carried thereby, is unavoidable, it is desirable that transmission of distortion to the tube shall be reduced so far as possible to avoid upsetting the alignment of the mirror and other optical apparatus carried by the tube. Accordingly, the coupling or gimbal connections between the yoke and the tube are constructed and arranged to provide for a small amount of universal movement, whereby the tube is virtually suspended at two points and it becomes possible to pre-calculate and test the tube and yoke as separate units. More particularly, each gimbal connection or coupling is comprised by a trunnion carried by and movable angularly with respect to the yoke, the trunnion having a head connected by a plurality of spokes to a ring carried by the tube, the spokes being arranged in cones or oppositely inclined so that the longitudinal axes thereof intersect at a common point in the trunnion axis, the spokes permitting of universal angular movement about axes normal to said point of intersection and resisting any tendency of the trunnion and ring to relative axial or radial displacement. In addition, torque-resisting means are arranged between the trunnion heads and the rings, such means preferably comprising sets of tension rods whose axes are arranged in the normal planes containing said points of intersection. Thus, it will be seen that the spokes provide for a universal connection employing the "elastic hinge" principle, with the result that friction is largely avoided while providing for angular flexibility sufficient to substantially prevent distortion of the yoke from being transmitted from the yoke to the tube with consequent upsetting of alignment between the mirror and the other optical apparatus carried by the tube.

A further object of my invention is to provide a trunnion connection between a pair of structures, wherein the trunnion has capacity for angular movement with respect to one of the members and is connected to the other member by means of spokes providing for angular movement about axes normal to the trunnion axis and preventing any relative axial or radial displacement of the trunnion with respect to said other member.

A further object of my invention is to provide a trunnion connection between two structures wherein the trunnion is carried by one of the members and is connected by means of a plurality of spokes and a torque-resisting device to the other member, the spokes being oppositely inclined so as to intersect at a common point on the trunnion axis and the torque-resisting device having sufficient transverse flexibility to permit of universal movement permitted by the spoke arrangement.

These and other objects are effected by my invention as will be apparent from the following description and claims taken in connection with the accompanying drawings, forming a part of this application, in which:

Fig. 1 is a side elevational view showing a telescope to which my invention is applicable;

Fig. 2 is a plan view of the apparatus shown in Fig. 1 and looking in the direction of the arrows;

Figure 3:
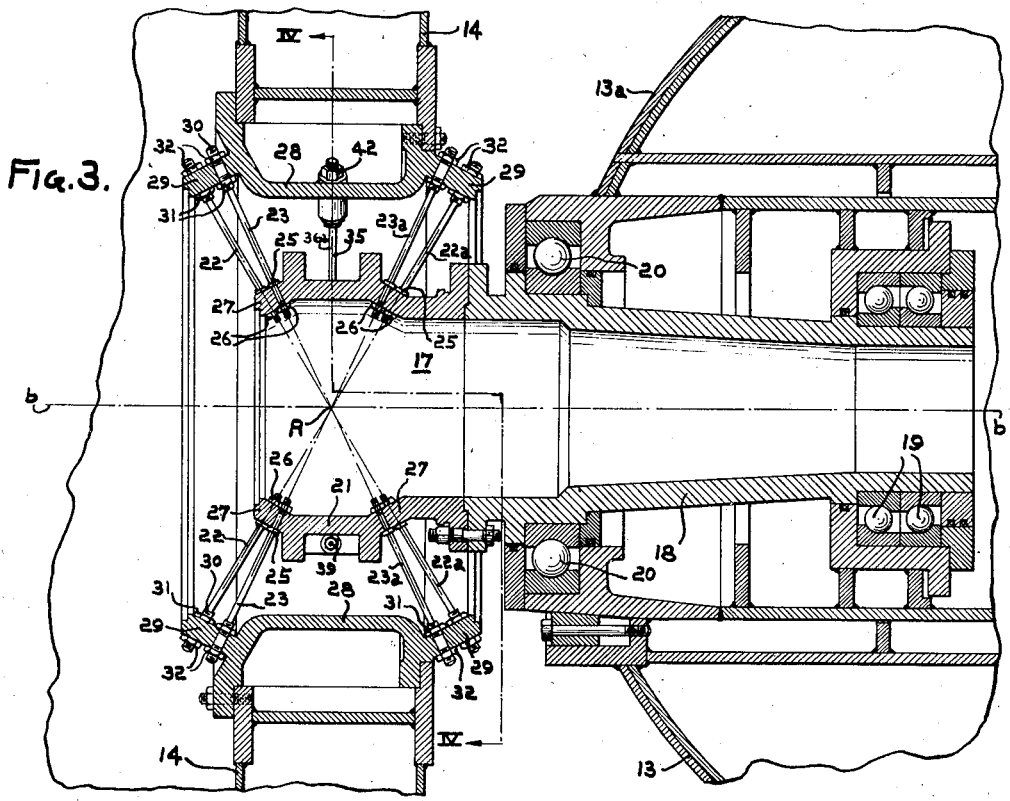
Fig. 3 is a longitudinal sectional view of one of the trunnion connections shown in Figs. 1 and 2 and taken along the line III—III of Fig. 4.

Referring to the drawings, in Fig. 1, the support 10 is provided with bearings, at 11 and 12, providing for angular movement of the yoke structure 13 about the axis a—a, which, with a telescope, is arranged to be directed toward the North Star and is, therefore, termed the polar axis.

The yoke structure 13 carries the tube structure 14 provided with the usual mirror, at 15, and other optical apparatus, a part of which, at 16, may be held in alignment therewith by the tube.

The yoke structure 13 has side portions 13a arranged between the bearings, at 11 and 12, and the side portions support the tube structure by means of trunnion devices, at 17, permitting of angular movement of the tube with respect to the yoke structure about the declination axis b—b. The capacity of the tube structure for angular movement about the mutually perpendicular axes a—a and b—b provides for direction of the tube structure's longitudinal axis c—c (Fig. 1) toward any particular star in the heavens and the yoke guides the tube structure firmly in its path in following the selected star in its movement from east to west.

As the yoke 13 and the tube 14 are each relatively large and heavy structures and as the tube must keep the mirror and other optical apparatus carried thereby in alignment, unless measures to the contrary are adopted, this alignment would be upset on account of transmission of distortion of the yoke to the tube, such distortion being due not only to the weight of the yoke but also to that of the tube carried thereby. Therefore, each of the gimbal connections or trunnion devices, at 17, includes a trunnion member 18 carried by and capable of angular movement with respect to the yoke structure 13, axially aligned and spaced bearings 19 and 20 supporting the trunnion member from the yoke and providing for angular movement about the axis b—b.

The trunnion member 18 has a head 21 connected to the tube structure 14 to provide for universal adjustment such that the tube structure is, in effect, supported at two spaced points A, A in the axis a—a, whereby both the tube and the yoke structures may be treated as separate units which can be pre-calculated and tested each by itself, the capacity for angular movement and adjustment about the supporting points A, A permitting distortion of the yoke structure, due to the weight of the latter as well as that of the tube carried thereby, from being transmitted by the yoke structure to the tube structure and, in consequence, upsetting the alignment of the mirror and other optical apparatus carried by the tube structure.

Figure 4:
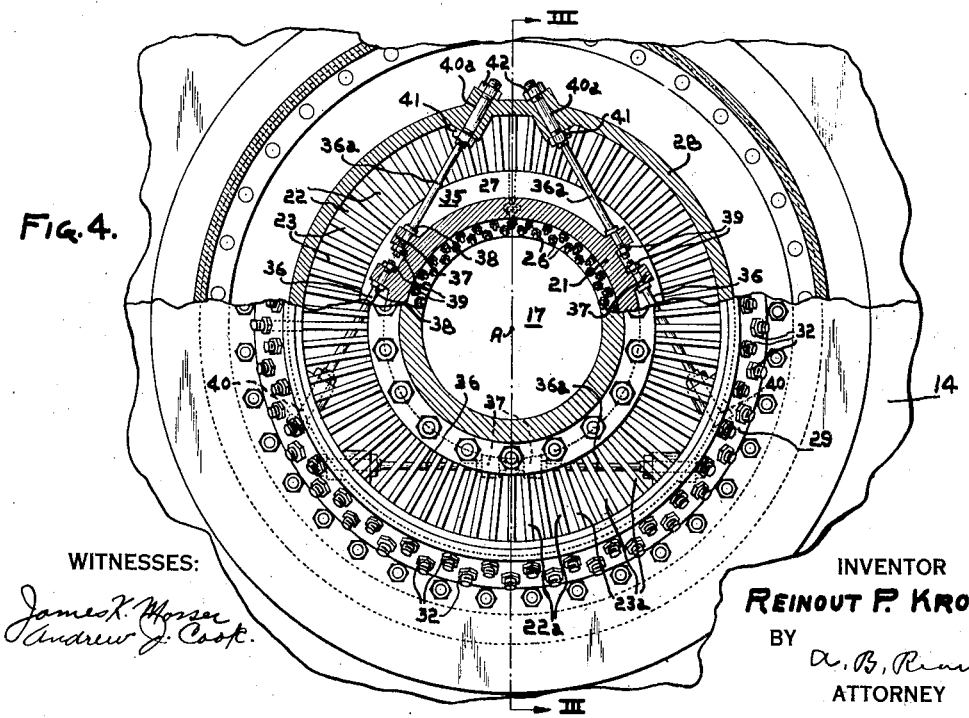
Fig. 4 is a transverse sectional view taken along the line IV—IV of Fig. 3.

Referring now to the universal connection between each trunnion terminal head 21 and the frame, as shown in Figs. 3 and 4, this is provided by a plurality of circumferential rows of spokes 22, 22a, 23, and 23a, the spokes being inclined in opposite directions so as to have their longitudinal axes intersect at a common point A. As the spokes present negligible resistance to transverse flexure, it will be apparent that the arrangement thereof provides a universal connection utilizing the "elastic hinge" principle and providing for relative angular movement to the extent required about axes normal to the trunnion axis b—b.

The inner ends of the spokes are connected in any suitable manner to the trunnion head 21, for example, each spoke is shown as provided with a flange 25 and an inner terminal nut 26 by means of which conical portions 27 of the head are firmly clamped to afford anchorage for the inner ends of the spokes, the conical portions 27 being, in effect, portions of limited transverse arcuate extent concentric with the point A. The outer ends of the spokes are connected to a ring member 28 carried by the tube structure 14, the ring member having conical flange portions 29 concentric with the portions 27 and with the point A. The outer end of each spoke is threaded, as shown at 30, for the reception of inner and outer nuts 31 and 32, whereby the intervening flange portion 29 may be firmly clamped by the nuts 31 and 32 and the outer end of each spoke connected to its flange portion 29.

In assembling the trunnion device, it is desirable to have the spokes 22, 22a, 23 and 23a uniformly tensioned and this may be done by subjecting each of the spokes to a uniform degree of tension, and with this condition of tension stress in each spoke, fastening it to its flange portion by suitable adjustment of the nuts 31 and 32.

Opposite inclination of the spokes so that their longitudinal axes intersect at a common point A on the axis b—b, not only provides for a universal connection utilizing the "elastic hinge" principle and affording the requisite capacity for angular adjustment about axes passing through the point A and normal to the trunnion axis b—b, but the spokes resist any tendency to axial or radial displacement of the trunnion member 18 relative to the ring 28.

A torque-resisting connection, at 35, is preferably provided between the ring 28 and the trunnion head 21 in order to relieve the spokes 22, 22a, 23, and 23a from being subjected to torque. Any suitable means may be used for this purpose so long as it affords the requisite transverse flexibility while at the same time being able to afford the necessary torque resistance, the means preferably being arranged in the normal plane passing through the spoke intersection point A.

Preferably, the transversely flexible torque-resisting means, at 35, is comprised by pairs of aligned rods 36 and 36a arranged tangentially with respect to the trunnion head 21 and having their inner and adjacent ends connected to the latter. For example, the inner ends of the tension rods 36 and 36a extend through radial lugs 37 of the trunnion head and have flanges 38 and nuts 39 for fastening them to the lugs. The outer ends of the tension rods 36 and 36a extend through chordally aligned openings 40 and 40a extending through the ring member 28, and, as with the outer ends of the spokes, the outer ends of the tension rods are threaded and inner and outer nuts 41 and 42 are associated therewith, the nuts being arranged for gripping of the ring therebetween. As with the spokes, the tension rods can also be subjected to a uniformity of tension.

In order that the pairs of tension rods may be in balanced relation with respect to the trunnion axis b—b, they are preferably arranged as several equi-distantly spaced pairs. Also, the terminal connections for the tension rods are so arranged that the axes of the rods fall in the normal plane passing through the spoke intersection point A.

From the foregoing, it will be seen that the trunnion devices, at 17, provide for the requisite angular movement of the tube with respect to the yoke about the axis b—b and that the connection between the trunnion heads and the tube rings affords the requisite universal movement about axes normal to the supporting points A, A to prevent the transmission of yoke distortion, due to weight of the yoke as well as to that of the tube carried thereby, from the yoke to the tube and causing, in consequence, upsetting of alignment of the mirror and other optical parts carried by the tube. This capacity for universal adjustment between the trunnions and the tube is preferably provided by flexible spokes acting on the elastic hinge principle, as the latter provides for the requisite movement or adjustment with a minimum degree of friction. In order that spokes may function in this manner, they are inclined oppositely so that their axes intersect at a common point with respect to the trunnion axis, this arrangement limiting displacement of the trunnion head with respect to the tube ring to angular movements about normal axes passing through the spoke intersection point on the trunnion axis. To avoid the spokes being subjected to torque effects, torque-resisting means is provided, such means being arranged so as not to interfere with the universal movement.

While the invention has been described with particular reference to a telescope, it is to be understood that it may be used in any situation where similar conditions and requirements are encountered.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In combination, a first structure having spaced side portions, a second structure extending through the space between the side portions, and pivot devices between opposite sides of the second structure and the side portions of the first structure and providing for support of the second structure by the first so that transmission of distortion of the first structure to the second is avoided; each of said pivot devices comprising an elongated trunnion, a plurality of bearings providing for angular movement between one of said structures and said trunnion and spaced axially with respect to the latter, a ring member encompassing the trunnion in radially-spaced relation and attached to the other structure, and a plurality of flexible spokes connecting the trunnion and the ring member, said spokes having their longitudinal axes intersecting at a common point on the axis of the trunnion and of the bearings and being inclined in opposite directions with respect to a plane normal to said axis and passing through said point of intersection.

2. In combination, a first structure having spaced side portions, a second structure extending through the space between the side portions, and pivot devices between opposite sides of the second structure and the side portions of the first structure and providing for support of the second structure by the first so that transmission of distortion of the first structure to the second is avoided; each of said pivot devices comprising an elongated trunnion, a plurality of bearings providing for angular movement between one of said structures and said trunnion and spaced axially with respect to the latter, a ring member encompassing the trunnion in radially-spaced relation and attached to the other structure, a plurality of spokes connecting the trunnion and the ring member, said spokes having their longitudinal axes intersecting at a common point on the axis of the trunnion and of the bearings and being inclined in opposite directions with respect to a plane normal to said axis and passing through said point of intersection, and torque-resisting means joining the ring and the trunnion member and providing for relative angular movement thereof about transverse axes passing through said point of intersection.

3. In combination, a first structure having spaced side portions, a second structure extending through the space between the side portions, and pivot devices between opposite sides of the second structure and the side portions of the first structure and providing for support of the second structure by the first so that transmission of distortion of the first structure to the second is avoided; each of said pivot devices comprising an elongated trunnion, a plurality of bearings providing for angular movement between one of said structures and said trunnion and spaced axially with respect to the latter, a ring member encompassing the trunnion in radially-spaced relation and attached to the other structure, a plurality of circumferential rows of spokes extending between the trunnion and the ring member, said spokes having their longitudinal axes intersecting at a common point on the axis of the trunnion and of the bearings and being inclined in opposite directions with respect to a plane normal to said axis and passing through said point of intersection, means for joining the inner and outer ends of the spokes to the trunnion and the ring member, respectively, and providing for adjustment so that the spokes may be tensioned to a uniform extent, a plurality of tension rods connecting the trunnion and the ring member and having their longitudinal axes arranged in said normal plane passing through said point of intersection, and means providing for tensioning of such rods to a predetermined extent.

4. In combination, a first structure having spaced side portions, a second structure extending through the space between the side portions, and pivot devices between opposite sides of the second structure and the side portions of the first structure and providing for support of the second structure by the first so that transmission of distortion of the first structure to the second is avoided; each of said pivot devices comprising an elongated trunnion, a plurality of bearings providing for angular movement between one of said structures and said trunnion and spaced axially with respect to the latter, a ring member encompassing the trunnion in radially-spaced relation and attached to the other structure, a plurality of circumferential rows of spokes extending between the trunnion and the ring member, said spokes having their longitudinal axes intersecting at a common point on the axis of the trunnion and of the bearings and being inclined in opposite directions with respect to a plane normal to said axis and passing through said point of intersection, means for joining the inner and outer ends of the spokes to the trunnion and the ring member, respectively, and providing for adjustment so that the spokes may be tensioned to a uniform extent, a plurality of pairs of aligned tension rods having their adjacent ends connected to the trunnion and extending tangentially in opposite directions so that the longitudinal axes thereof fall in said normal plane passing through said point of intersection, and means for connecting the outer ends of the tension rods to the ring member and providing for tensioning of the rods to a predetermined extent.

5. In combination, a first structure having spaced side portions, a second structure extending through the space between the side portions, and pivot devices between opposite sides of the second structure and the side portions of the first structure and providing for support of the second structure by the first so that transmission of distortion of the first structure to the second is avoided; each of said pivot devices comprising an elongated trunnion, a plurality of bearings providing for angular movement between one of said structures and said trunnion and spaced axially with respect to the latter, a ring member encompassing the trunnion in radially-spaced relation and attached to the other structure, a plurality of circumferential rows of spokes extending between the trunnion and the ring member, said spokes having their longitudinal axes intersecting at a common point on the axis of the trunnion and of the bearings and being inclined in opposite directions with respect to a plane normal to said axis and passing through said point of intersection, means for joining the inner and outer ends of the spokes to the trunnion and the ring member, respectively, and providing for adjustment so that the spokes may be tensioned to a uniform extent, three tension rod arrangements attached to and having rod portions extending tangentially from the trunnion so that their longitudinal axes fall in said normal plane passing through said point of intersection, said arrangements being equi-distantly spaced circumferentially with respect to the trunnion, and means for connecting the ring member to the outer ends of said rod portions and providing for tensioning thereof to a predetermined extent.

REINOUT P. KROON.